United States Patent [19]

Barrett

[11] Patent Number: 4,604,026
[45] Date of Patent: Aug. 5, 1986

[54] TELESCOPING PARTS MANIPULATOR

[75] Inventor: Keith Barrett, Langwarrin, Australia

[73] Assignee: Dart Industries Inc., Northbrook, Ill.

[21] Appl. No.: 561,418

[22] Filed: Dec. 14, 1983

[30] Foreign Application Priority Data

Mar. 1, 1983 [AU] Australia ............................... PF8254

[51] Int. Cl.[4] ............................................. B25J 11/00
[52] U.S. Cl. .................................... 414/728; 414/718; 414/737; 414/752
[58] Field of Search ............... 414/718, 728, 736, 737, 414/738, 744 B, 752

[56] References Cited

U.S. PATENT DOCUMENTS

| 2,953,934 | 9/1960 | Sundt | 343/903 |
| 3,146,450 | 8/1964 | Dooner | 343/903 X |
| 3,253,799 | 5/1966 | Till | 343/903 |
| 3,598,263 | 8/1971 | Ehmke | 414/737 X |
| 3,836,025 | 9/1974 | Olson et al. | 414/718 X |
| 3,912,317 | 10/1975 | Ohnaka | 414/752 X |
| 4,139,852 | 2/1979 | Koyanagi | 343/903 |
| 4,323,902 | 4/1982 | Hussey et al. | 343/903 |
| 4,436,476 | 3/1984 | Yoritomi | 414/718 X |
| 4,444,537 | 4/1984 | Werner | 414/737 X |
| 4,482,288 | 11/1984 | Rovetta | 414/718 X |

FOREIGN PATENT DOCUMENTS

0222901 10/1968 Sweden ................................. 414/728

Primary Examiner—W. R. Wolfe
Attorney, Agent, or Firm—A. Lewis Worthem, Jr.; John R. Harris

[57] ABSTRACT

A telescoping parts manipulator comprising a telescoping tubular arm which is extended and retracted by a cable from a cable drum, and a workpiece engaging assembly which pivots on a wrist swivel axis carried at the end of the telescoping arm which engages molded articles in a molding machine. The telescoping arm is mounted to a slide box which moves forward and backward to allow engagement with a molded article, clearance of the tie bars in the mold, and movement towards a work station such as a conveyor belt. The cable is a hollow nylon tube which provides vacuum from a vacuum source through the telescoping arm to suction cups at the end of the arm which engage the molded articles.

26 Claims, 16 Drawing Figures

TELESCOPING PARTS MANIPULATOR

TECHNICAL FIELD

The present invention relates generally to robotics and workpiece manipulators, and more specifically relates to a telescoping parts manipulator useful in applications wherein space limitations preclude use of conventional robotic manipulators, and especially useful for removing molded parts from a molding machine and placing the parts at a work station removed from the mold.

BACKGROUND OF THE INVENTION

Automatic manipulator apparatus have been developed for work operations such as welding, assembly, removal and handling of parts, and other types of repetitive work cycles. Some of these manipulators are programmable and allow the manipulator to be reused for different tasks requiring different sequences of movements through a variable work space.

One type of programmable multi-axis automatic assembly system is shown in U.S. Pat. No. 4,275,986 to Engelberger et al., which discloses a manipulator having six axes of motion for great flexibility in sequencing of movement and positioning of the manipulator hand. This type of manipulator, as well as many other similar articulated-arm devices, is for some applications too large, expensive, and complex. For many basic pick-and-place operations, use of hydraulic power or precision encoder position control is simply overengineering.

At the opposite extreme of parts manipulation devices are apparatus such as disclosed in U.S. Pat. No. 3,947,208 to Broderick. This device finds application in press molding machines and the like, and includes an extracting arm mounted on a translating and rotating drive shaft moved by the opening of the mold. A cam mechanism causes the arm to swing into the space between mold halves and grip the parts, and to thereafter swing out of the machine and release the part. Although the device is comparatively simple and inexpensive, it is a dedicated device, not reprogrammable, and suffers especially from the drawback that it is unable to extract a part, reorient the part to another plane, and discharge the part at a remote workstation. Such operations are frequently desirable for removing parts from a molding machine and placing the parts on a conveyor belt for further processing.

For injection molding factories, plant layout requirements sometimes dictate that molding machines be placed relatively close to one another, thereby limiting the amount of space available for a parts manipulator to remove the molded parts. There is often insufficient space for installation of a conventional multi-axis robotic manipulator. Even though smaller and lighter electrically driven manipulators having articulated joints are now commonly available, space limitations sometimes preclude use of these articulated-joint mechanisms because entry of the manipulator hand into the mold and retraction of the part forces the articulated arm to assume awkward positions as the hand is guided between the tie bars of the molding machine and into the mold cavity between the mold halves. In some applications, it may be impossible to apply an articulated-arm manipulator whose elbow might interfere with other machinery as the manipulator assumes its various positions in extracting and removing the parts.

In applications where space is at a premium, telescoping boom devices such as shown in U.S. Pat. No. 3,916,701 to Butler have been proposed. This patent discloses an industrial robot for grasping, manipulating and moving parts including a telescoping boom assembly mounted for movement about two orthogonal axes and a part gripper mounted on the forwardmost end of the telescoping boom assembly. The part gripper is rotatably movable about a third axis which is substantially parallel to the longitudinal axis of the telescoping boom assembly. The gripper in this patent is rotated about its axis by a rotary actuator mounted within the forwardmost telescoping boom element and includes an hydraulically actuated linear-to-rotary converter.

One problem with the Butler and other prior art parts manipulators is that they are frequently large and heavy machines designed for industrial environments requiring handling of articles through precise programmed movements. For removal of molded parts from an injection molding machine, there is seldom need for precision movement in engaging an article in the molding machine and removing the article to a remote work station such as a conveyor belt. There is also seldom need for high powered hydraulic actuator mechanisms since injection molded pieces typically are small and lightweight when compared to comparably sized metal articles. Yet, flexibility in sequence and extent of movement is a desireable feature.

Accordingly, there is the need for a simple, inexpensive, lightweight, and small parts manipulator having movement and sequence flexibility and suitable for use in parts extraction from molding machines. Such a manipulator must successfully enter the space between the mold halves, engage or grasp the molded parts, retract the molded parts, and place the parts at a remote work station such as on a conveyor belt or the like.

SUMMARY OF THE INVENTION

The above-mentioned and other problems with prior art parts manipulators are overcome with the present invention, which provides a workpiece manipulator especially suitable for engaging molded articles in a molding machine and for removing the articles from the molding machine and placing them at a remote location. Briefly described, the present invention comprises an extensible arm mounted to a base portion or slide box and comprising a plurality of coaxial tubular telescoping members extensible and retractable along a longitudinal axis. The arm is extended and retracted by means of a cable or flexible hollow tube, which may be supported internally by a second smaller diameter flexible hollow tube, having compressive strength sufficient to support the arm when the arm is fully extended. The cable is housed within and supports the tubular members and has one end attached to the innermost one of the tubular members and the other end spooled about a cable drum. A motor is provided for rotating the drum in one direction for winding the cable to retract the arm, and for rotating the drum in the other direction for unwinding the cable to extend the arm. The manipulator further includes a workpiece-engaging assembly for engaging the workpiece or molded article in the mold and for carrying the article as the arm retracts.

In the preferred embodiment, the tubular members of the arm have rectangular cross-sections, thus eliminating the need for mechanisms to prevent relative rotation between arm members which would be required for cylindrical arm members. Nevertheless, if arm rotation is desired for a particular application, the invention may be practiced with cylindrical arm members.

More particularly described, the present invention includes a wrist swivel joint attached to the upper end of the arm and pivotable about a wrist bend axis which is perpendicular to the longitudinal axis of the arm. The workpiece-engaging assembly is mounted to the wrist swivel joint and movable therewith for engaging the molded article in the mold and for pivoting to discharge the article. In the preferred embodiment, the workpiece or article is engaged by one or more suction cups connected to a source of vacuum which is selectively operable to impart suction to the suction cup for engaging and removing the articles and to releae suction for discharging the articles.

The preferred embodiment further comprises a carriage assembly for supporting the base of the manipulator which is movable between a first position and a second position spaced apart from the first position. Driving means, in the disclosed embodiment a pneumatic cylinder, is provided for moving the base between the first position and the selectively adjustable second position. The carriage further includes a guide bar or rod upon which the base is mounted with supporting sleeves or bushings to guide the base smoothly between the first and second positions.

In the preferred embodiment, the cable which extends and retracts the arm is a pliant yet semi-rigid hollow elongate nylon tube further supported by a similar but smaller diameter nylon tube fitted coaxially within the larger tube. The workpiece manipulating assembly at the end of the arm includes a fluid connector to which one of the hollow nylon tubes is connected. The spooled end of the nylon tube is attached to a second fluid connector on the hub of the drum. A bore is provided in the axle of the drum and allows connection of a fluid source such as air pressure or a vacuum to the fluid connector, through the cable, and through the workpiece assembly fluid connector. Thus, the source of vacuum is conveniently provided through the cable through the fluid connectors and thence to the suction cups.

By using a hollow cable to provide thrust and pull to the arm as well as to deliver vacuum to the workpiece-engaging assembly, the present invention facilitates the use of rectangular arm section members and eliminates the need for fluid-tight seals between arm members. Thus, the invention affords significant advantages in reliability and economy.

The preferred embodiment of the present invention further includes a sequencing mechanism or controller responsive to the cycles of the molding machine for controlling the sequence of movements of the various elements of the manipulator. In particular, the sequencing controller is responsive to the opening of the mold for providing an extraction signal, which causes the arm extending and retracting elements to extend the arm into the cavity between the mold halves. Thereafter, the sequencing controller causes the carriage to move forward, placing the suction cups upon the articles to be removed, and actuates the source of vacuum so that the suction cups positively engage the articles. The carriage then retracts, and the arm also retracts, carrying the articles.

When the arm has completely retracted, or has reached a desired level of retraction, the carriage can again be moved forward to move the article engaged by the arm toward a work station. In the preferred embodiment, the carriage assembly moves forward towards a conveyor belt. When the carriage has reached its desired extent of movement near the conveyor belt, the wrist swivel joint pivots, allowing the workpiece-engaging assembly to pivot downwardly towards a horizontal position, and the suction is released, thereby discharging the article onto the conveyor belt.

Thus, the method of the present invention practiced by the preferred embodiment includes the steps of triggering a manipulator cycle at a predetermined point in the machine cycle of an article production machine such as an injection molding machine, extending a telescoping manipulator arm carrying a workpiece-engaging device into the space between the mold halves after the mold is open, moving the workpiece-engaging device into engagement with the article in the mold, removing the article from the mold, retracting the arm and the article from between the mold halves prior to the closing of the mold for a new cycle, moving the manipulator arm and the article carried thereby forward towards a work station, and pivoting the workpiece-engaging device forward towards the work station and releasing the article.

Accordingly, it is an object of the present invention to provide an improved apparatus and method for removing articles from a molding machine.

It is another object of the present invention to provide an improved parts manipulator comprising a plurality of telescoping tubular members which can extend to engage an article in a confined space and can thereafter retract, carrying the article away from the confined space.

It is another object of the present invention to provide a telescoping parts manipulator which is lightweight, compact, and does not require complex and costly hydraulics or precision electrical actuators or position encoders in order to operate.

It is another object of the present invention to provide an improved telescoping parts manipulator including an arm which is caused to extend by the unwinding of a flexible yet compressively semi-rigid cable from a cable drum, and which is caused to retract by winding the cable onto the drum.

It is another object of the present invention to provide an improved telescoping parts manipulator whose arm retracts and extends by means of a cable which is also capable of carrying fluids from the base of the manipulator arm to the workpiece-engaging end of the manipulator arm.

These and other objects, features, and advantages of the present invention may be more clearly understood and appreciated from a review of the following detailed description of the disclosed embodiment and by reference to the appended drawings and claims.

BRIEF DESCRIPTION OF THE DRAWINGS

FIG. 9, A-F show the steps taken by the preferred embodiment in removing an article from a mold and placing it on a conveyor belt.

DETAILED DESCRIPTION OF THE PREFERRED EMBODIMENT

Figure 1:
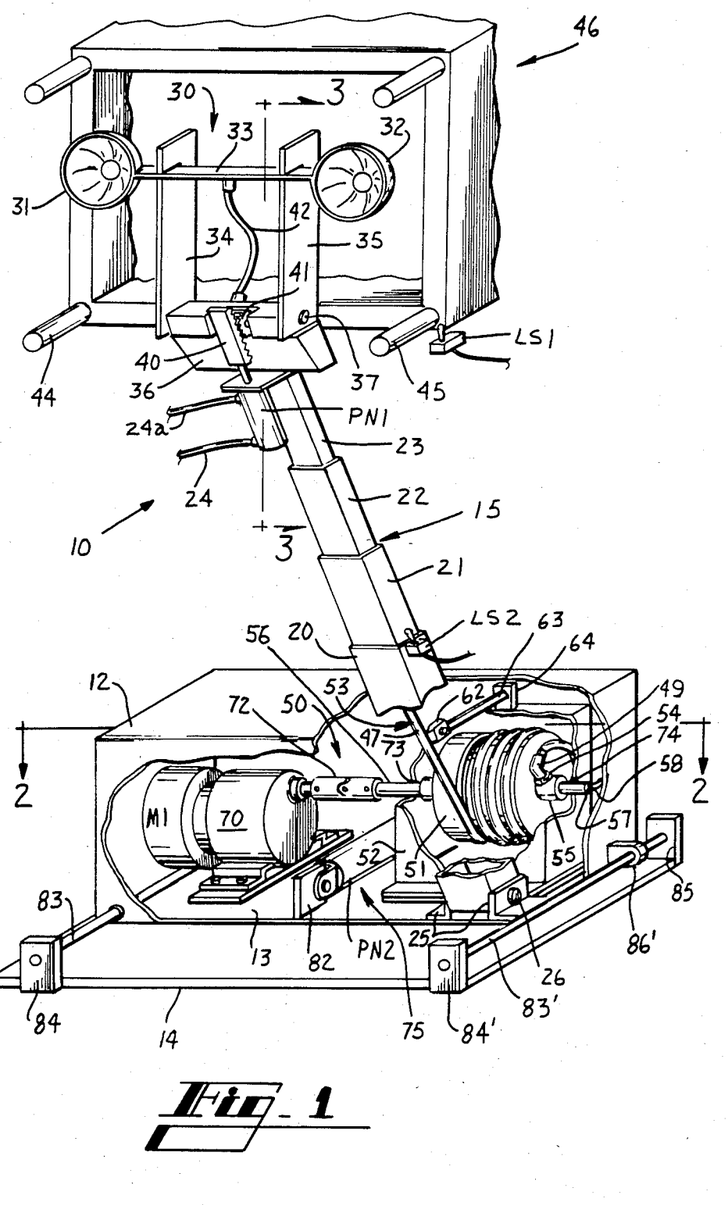
FIG. 1 is a cutaway pictorial perspective view of the preferred embodiment of the telescoping parts manipulator of the present invention.

Referring now to the drawings, in which like numerals indicate like elements throughout the several views, FIG. 1 shows a preferred embodiment of a telescoping parts manipulator 10 constructed in accordance with the present invention. The parts manipulator 10 includes a base portion or slide box 12, a portion of which has been cut away in FIG. 1 to show the elements housed therein. The bottom panel 13 of the base portion 12 rests atop a base plate 14 and slides thereacross by a slide box carriage assembly which will be described below.

Figures 3, 4, 5:
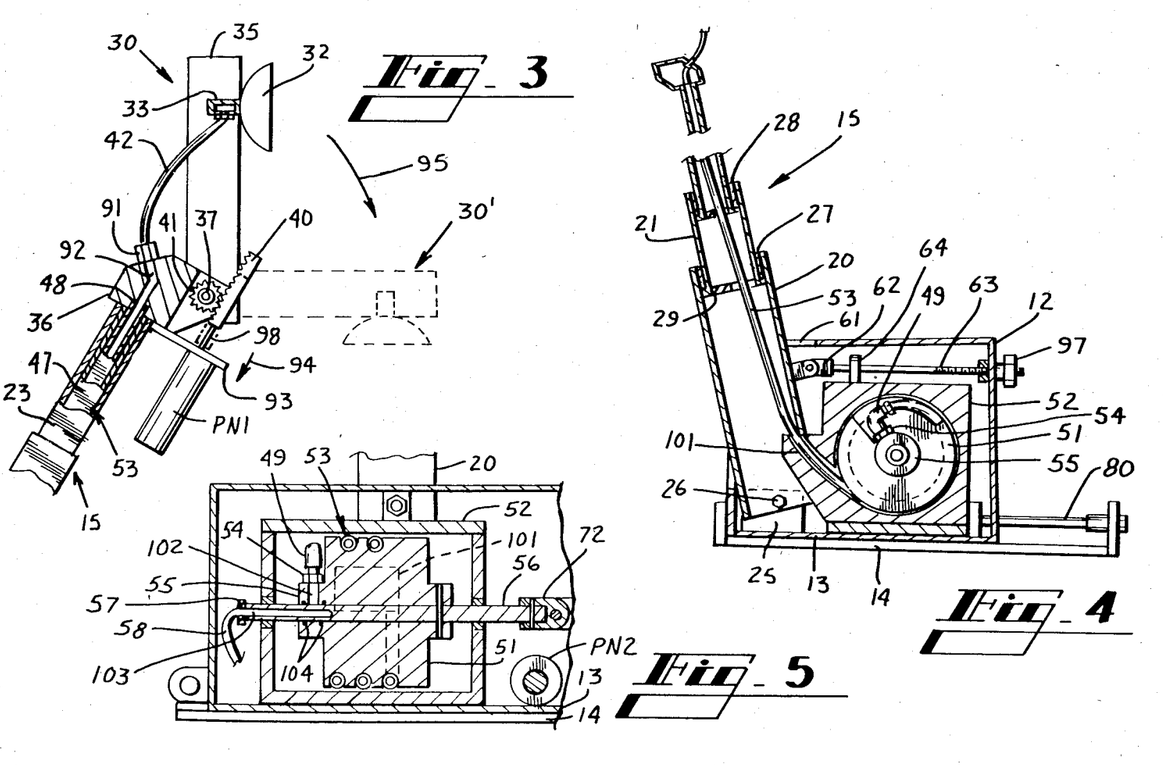
FIG. 3 is a fragmentary side view of the suction cup wrist swivel workpiece-engaging assembly taken along the line 3—3 of FIG. 1, with parts cut away.
FIG. 4 is a partial left side cross-sectional view taken along line 4—4 of FIG. 2.
FIG. 5 is a partial fragmentary cross-sectional view of the cable drum taken along the line 5—5 of FIG. 2.

A telescoping extensible and retractable arm 15 comprising a plurality of tubular coaxial telescoping sections or members 20, 21, 22, 23 is attached to the bottom panel 13 of slide box 12 by means of brackets 25 and a rod 26 which extends through the bottom of the lowermost section 20. The arm 15 extends upwardly and away from the slide box 12 at a slight angle. Preferably, each of sections 20-23 is aluminum, as is the slide box 12, for light weight. Guide sleeves 27, 28 (seen in FIG. 4) of Teflon or similar low-friction material are affixed by screws or the like to the upper end of each of the telescoping sections to provide ease of sliding movement and to serve as an extension stop by catching a flange affixed to the bottom of the next section. A typical flange 29 for the section 21 is seen in FIG. 4.

Returning to FIG. 1, a workpiece-engaging assembly 30 is mounted to the end of the uppermost arm section 23. The workpiece-engaging assembly comprises a pair of suction cups 31, 32 which are attached at opposite ends of an elongate horizontal mounting bar 33. Bar 33 is mounted to a pair of vertically-extending parallel stanchions 34, 35. Parallel stanchions 34, 35 are mounted for pivotable movement about a mounting block 36 by a shaft 37 which extends through both of stanchions 34, 35 and mounting block 36. Mounting block 36 is affixed to the uppermost section 23 with bolts or the like.

A double acting pneumatic cylinder PN1 actuated by gas selectively delivered through hoses 24, 24a causes the workpiece-engaging assembly 30 to pivot by means of a rack 40 and pinion 41 about an axis defined by shaft 37. It will now be appreciated that the stanchions 34, 35 and mounting block 36 comprise a wrist swivel joint perpendicular to the longitudinal axis of the arm, and pivotable between a first, substantially vertical position and a second, substantially horizontal position. It will also be appreciated that position control means such as a servomechanism and encoders can be employed at the end of the arm should the applications require absolute position control.

The workpiece-engaging assembly 30 in the preferred embodiment is sized to fit between tie bars 44, 45 of a molding machine 46. A limit switch LS1 is actuated by the opening of the mold of the molding machine 46 and provides a signal which is used in the preferred embodiment to trigger the extension of arm 15 and the removal of molded articles from the molding machine by the suction cups 31, 32 of the workpiece-engaging assembly 30.

Still referring to FIG. 1, the telescoping arm 15 is extended and retracted with an extending and retracting assembly 50. The extending and retracting assembly 50 comprises a cable drum 51 which is housed within a housing block 52. Housing block 52 is mounted to the bottom panel 13 of slide box 12 by bolting, welding, or the like. Cable drum 51 is helically grooved for spooling a cable 53 which extends and retracts the arm 15. In the preferred embodiment, cable 53 is a hollow outer tube 47 with a coaxial inner tube 48 (FIG. 3) which conducts a fluid flow between the workpiece-engaging assembly 30 and the cable drum 51.

One end of the cable 53 is attached to a stemmed elbow 49 which, in turn, is attached to a fluid fitting 54 mounted on the outer surface of the hub 55 of the drum 51. The cable 53 exits through an opening 101 (shown in FIGS. 2, 4, and 5) in the housing block 52 and thence enters the telescoping sections 20-23 of arm 15. The cable is housed within the telescoping sections and terminates within at mounting block 36. The inner tube 48 of the cable 53 is in fluid communication with a hose 42 extending from the mounting block 36 to the bar 33. Bar 33 is hollow, forming fluid passageways in communication with the suction cups 31, 32 and hose 42. The shaft 56 which supports the cable drum 51 within the housing block 52 also includes a bore which permits fluid communication between the stemmed elbow 49, the fluid fitting 54 and the hub 55. A fluid fitting 57 is provided at the end of shaft 56 and allows fluid communication through a hose 58 to the source of vacuum. Thus, a vacuum is delivered to the suction cups 31, 32 through inner tube 48.

The angle of the arm 15 is adjustable by means of rod 63 extending between support 64 mounted on the block 52 and clevis 62 fixed to the arm 15. As described more fully below, rod 63 can be extended or retracted to cause arm 15 to pivot about rod 26.

An electric motor M1 provides power for extending and retracting the arm. Motor M1 is mounted to a reduction drive 70 which reduces the speed of motor M1 to provide an appropriate extension rate and torque for driving the cable drum 51. The reduction drive 70 and motor M1 are mounted to the bottom panel 13 of the slide box 12 by bolts, welding, or the like. A universal joint 72 with shear pins drivingly connects the output shaft of drive 70 to the shaft 56 of the cable drum. Shaft 56 is supported in housing 52 for rotation by bearing bushings 73, 74.

Figure 2:
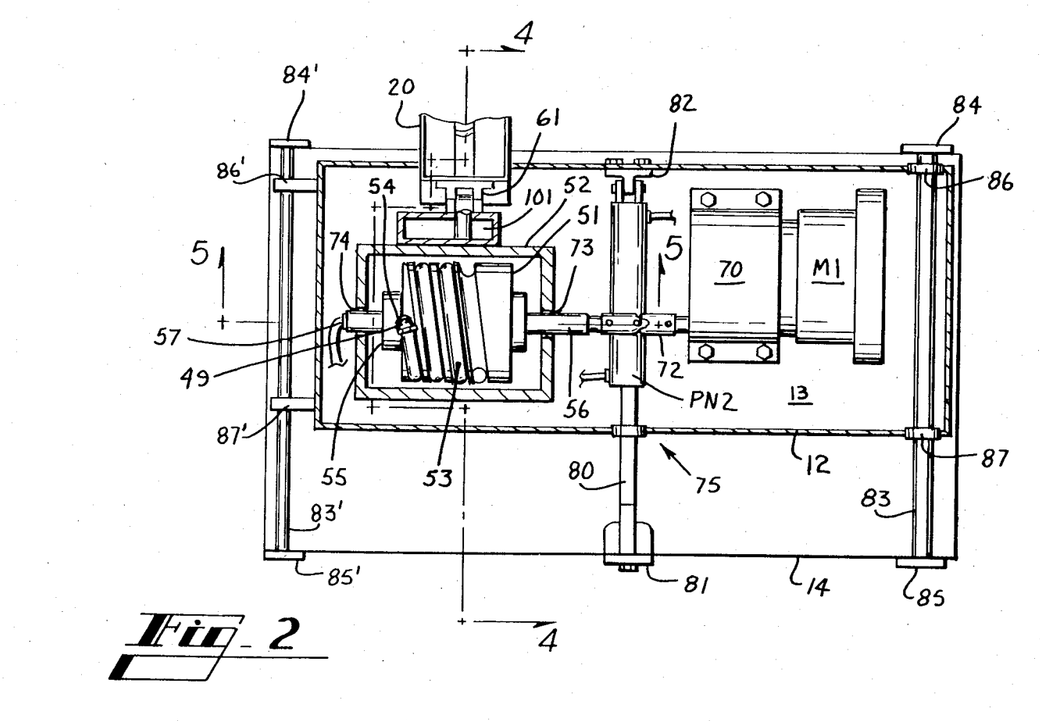
FIG. 2 is a top plan partial cross-sectional view taken along the line 2—2 of FIG. 1.

As mentioned above, the bottom panel 13 of the slide box 12 moves across the base plate 14 via a slide box carriage assembly 75. The carriage assembly comprises a double acting pneumatic cylinder PN2 mounted to move the slide box 12 along the base plate. As best seen in FIG. 2, the actuator rod 80 of the pneumatic cylinder PN2 is affixed by a bolt or the like to a support 81, which in turn is affixed to the base plate 14. The outer housing of cylinder PN2 is connected to a cyliner mount 72 which is rigidly affixed to a side wall or bottom panel 13 of the slide box 12. A pair of guide rods 83, 83' parallel to cylinder PN2 and mounted at each end by supports, 84, 85, 84', 85 to the base plate 14 insure that the slide box 12 will move in a straight line across the base plate. Each guide rod 83, 83' is slidably received in slide bushings 86, 87, 86', 87' made of TEFLON synthetic resin polymer material or other suitable low-friction material which are mounted to the slide box 12. It will now be understood that in the preferred embodiment the slide box moves between a first or rearward position or to any selected position therebetween.

Referring now to FIG. 3, it may be seen that the upper end of cable 53 extends through the uppermost telescoping section 23. Outer tube 47 terminates at and is fixed to mounting block 36 communicating with bore 92 formed through the block. Connector 91 atop the mounting block 36 connects hose 42 which in turn is connected to bar 33. The connection of cable 55 to mounting block 36 bears the thrust and pull of cable 53 to extend and retract arm 15. The connections of inner tube 48 and hose 42 are fluid tight to deliver vacuum to suction cup 32 (and 31).

Shaft 37 extends laterally through a second bore within the mounting block 36 with its ends fixed to stanchions 35 (and 34) and rotatably supported by roller bearings fixed to the ends of the mounting box 36. Pinion 41 is fixed to and co-rotatable with shaft 37. Pneumatic cylinder PN1 is fixed in spaced parallel relation to arm section 23 by bracket 93 adjacent the mounting box 36.

Rack 40 is fixed to the actuator rod 98 of pneumatic cylinder PN1. The teeth of rack 40 engage pinion 41. FIG. 3 shows that by actuating pneumatic cylinder PN1 to retract rod 98 as represented by arrow 94, the workpiece-engaging assembly 30 rotates in the direction represented by arrow 95 to the new position shown at 30' in readiness to discharge a workpiece.

Referring to FIG. 2, it may be seen that the cable 53 exiting the lower end of the arm is guided into the housing block 52 an thence winds about the cable drum 51. An opening 101 is provided in the housing block 52 for receiving the cable 53 and for guiding the cable onto the drum. Opening 101 is laterally widened to accommodate the width of the helical grooves of the drum 51. It will be appreciated that the clearance between the edges of cable drum 51 and housing block 52 is relatively small so as to contain the cable within the grooves and ensure frictional contact between the cable and the cable drum to minimize the risk of slippage as the drum unwinds the cable to extend the arm and winds the cable to retract the arm.

FIGS. 4 and 5 are cross-sectional views which more clearly illustrate certain aspects of the present invention. For example, the provision of cable 53 through the opening 101 and across wheel tube guide 61 into the arm 15 is more clearly illustrated. Furthermore, it may be seen that the end of cable 53 is provided to stemmed elbow 49 on fluid fitting 54 on the hub 55 of the drum 51. The hub 55 is seen to include a radial bore 102 which opens into a mating radial bore in the shaft 56, and thence into an axial bore 103 provided in the shaft 56. O-rings 104 seal the juncture between shaft 56 and drum 51. It will now be appreciated that a vacuum source or other fluid supply provided on hose 58 communicates with cable 53 through the fluid fitting 57, axial bore 103, radial bore 102, fluid fitting 54, and through stemmed elbow 49 into cable 53.

As best shown in FIG. 4., rod 63 has a threaded rearward end extending through the rear wall of slide box 12. Knob 97 is threaded onto rod 63 such that turning knob 97 changes the angle of arm 15.

Figure 6:
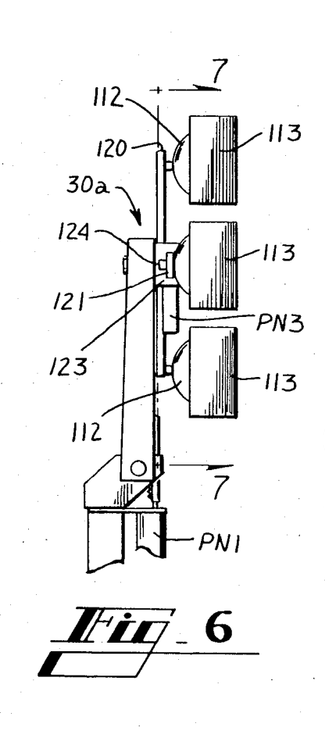
FIG. 6 is a side view of an alternative scissoring 4-cup workpiece-engaging assembly.
Figures 7, 10, 11:
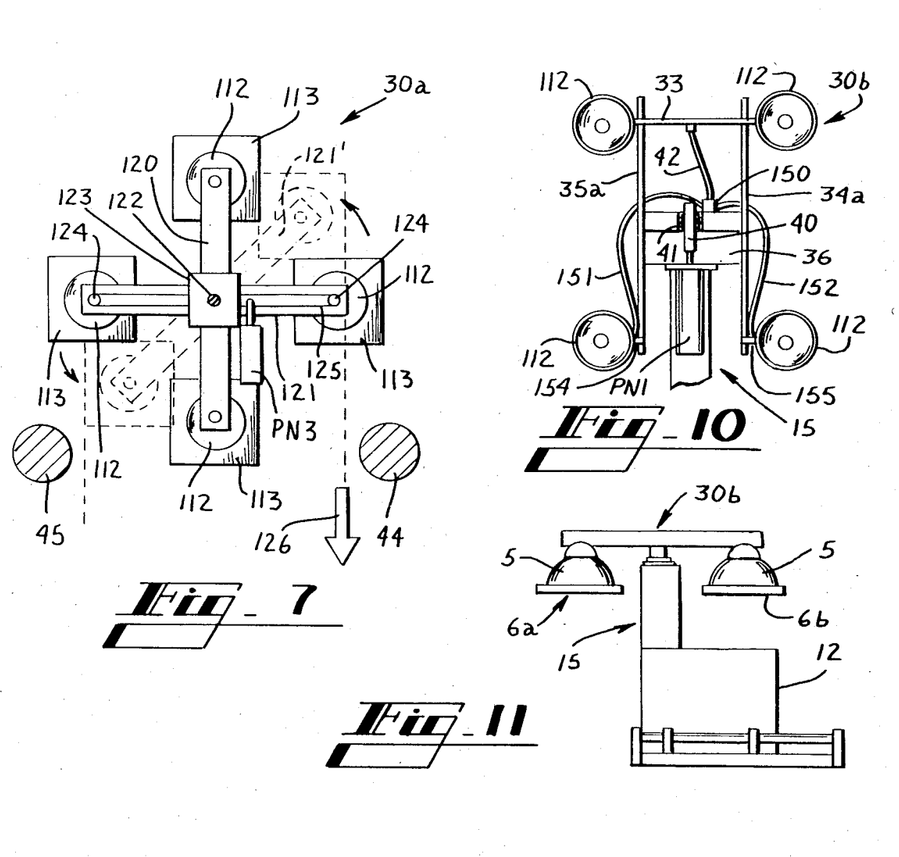
FIG. 7 is a rear view of the scissoring assembly in FIG. 6.
FIG. 10 is a fragmentary front view of an alternative 4-cup workpiece-engaging assembly.
FIG. 11 shows articles being placed on a double conveyor belt by a manipulator having the 4-cup workiece-engaging assembly of FIG. 10.

In FIGS. 6 and 7, there is illustrated an alternative workpiece-engaging assembly 30a comprising four suction cups 112 mounted in a cross arrangement for engaging with four workpieces 113. A vertical mounting bar 120 and a horizontal mounting bar 121 are pivotably cross-mounted via a pivot pin 122 at a housing 123 for scissoring movement. A pneumatic cylinder PN3 is attached to the vertical mounting bar 120 and operatively connected to the horizontal bar 121. Upon actuation of pneumatic cylinder PN3, the horizontal mounting bar 121 pivots or scissors to the position shown at 121'.

The suction cups 112 carried by the horizontal mounting bar 121 are pivotably attached to the mounting by hubs 124 and belt 125 so that upon the scissoring motion, the articles engaged by the suction cups maintain an orientation wherein their sides remain parallel to one another. It will now be appreciated that the combination of scissoring of the horizontal mounting bar 121 and the pivoting of the workpieces carried by the suction cups on the horizontal mounting bar allows clearance of tie bars 44, 45 of the molding machine as the assembly 30a moves in the direction of arrows 126. It will also be appreciated that such an arrangement allows for removal from the mold of four workpieces which otherwise might have required two separate removal operations. Therefore, the workpiece-engaging assembly 30a shown in FIG. 6 allows utilization of more of the space between tie bars of a molding machine for placement of molds. Molds can be positioned directly above the tie bars, and the molded articles can be manipulated to avoid the tie bars upon removal from the mold. Furthermore, the workpiece-engaging assembly 30a may be adapted to manipulate any required number of workpieces.

In some prior art molded article removal systems, the space vertically above tie bars such as 44 and 45 was unusable for gravity-drop removal systems and required manipulators with greater degrees of freedom (and consequently more complexity in cost) in order to manuever the molded articles immediately above the tie bars out of the way of the tie bars to remove the articles from the space between the molding halves. The embodiment of the workpiece-engaging assembly 30a shown in FIG. 6 therefore provides an inexpensive yet effective apparatus for removing molded articles from above the tie bars.

In FIG. 10, there is shown a second alternative workpiece-engaging assembly 30b similar to the assembly 30 shown in FIG. 1 but having four suction cups. Stanchions 34a and 35a extend upwardly and downwardly from mounting box 36. Short hollow bars 154, 155 support suction cups 112 adjacent the lower ends of stanchions 34a and 35a. A three-way fluid connector atop mounting box 36 distributes a vacuum to bars 33, 154, 152 and thence to suction cups 112. Pivoting of the assembly 30b is effected in the same manner described above using a pneumatic cylinder and rack and pinion arrangement.

Figure 8:
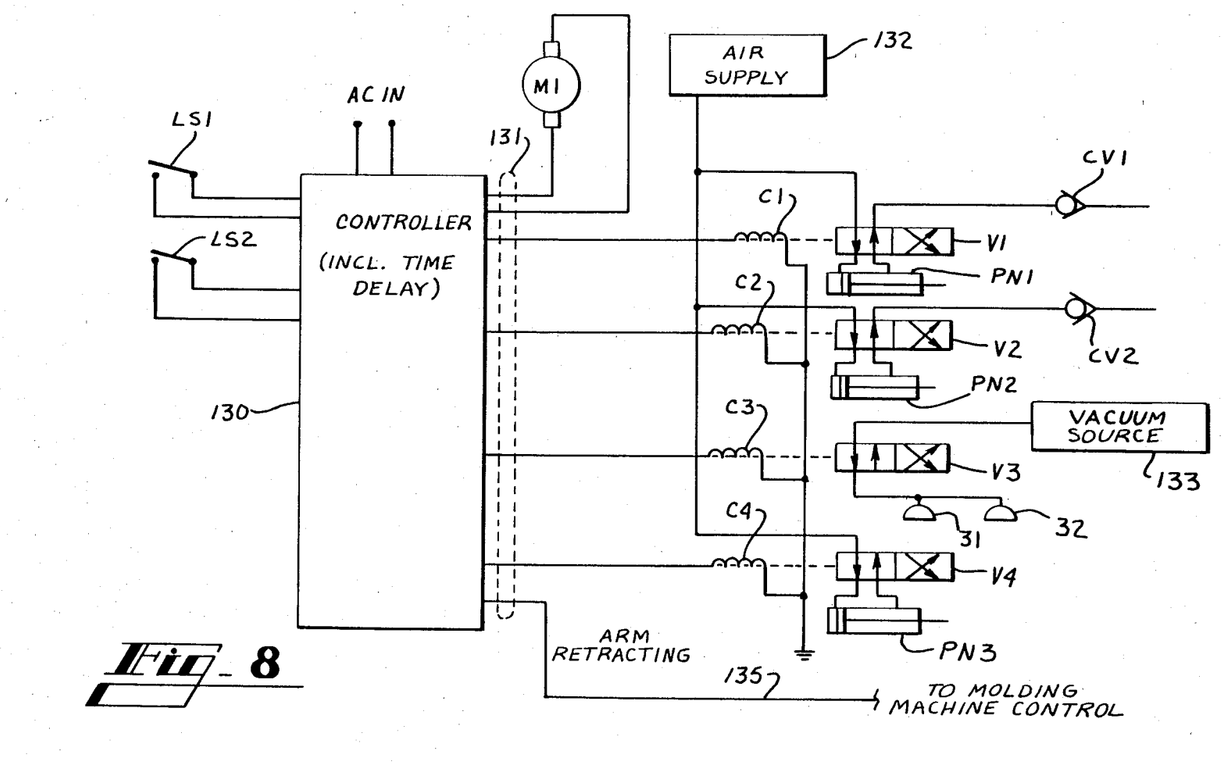
FIG. 8 is a schematic diagram of the sequencing controller used in the preferred embodiment.

FIG. 8 illustrates in schematic form the sequencing mechanism or controller used in the preferred embodiment. Although limit switch LS1 provides an extraction signal upon the opening of the mold halves and limit switch LS2 signals that arm 15 is fully retracted in the preferred embodiment, it will be understood that the extraction and retraction signals can be obtained in various other means from the control devices for molding machinery. Whether limit switch signals or other signals obtained from control devices of the molding machinery are used, they are provided to a controller 130. Controller 130 may comprise digital logic circuits, relay logic, delay relays, pneumatic control logic, or other similar control methods known to those skilled in the art. The controller 130 provides signals on lines 131 to control the various motors and actuators used in the preferred embodiment.

The controller 130 is responsive to the extraction signal to actuate motor M1 to drive the cable drum and extend the arm into the space between mold halves after an appropriate delay to ensure that the mold has completely opened before the workpiece-engaging assembly enters the space between the mold havles. The length of extension of the arm 15 is controlled in the preferred embodiment by means such as a counter or a timer in controller 130 which runs motor M1 for a sufficient period of time to allow the workpiece-engaging assembly 30 to reach the desired height. Those skilled in the art will understand how to adjust a timer for length extension adjustment of the arm. Those skilled in the art will also understand that a servomechanism drive may be provided for motor M1, together with encoder means attached either to the shaft of the cable drum or at other suitable points in the apparatus for feedback control, whereby absolute position control may be obtained for the length extension. It is therefore within the scope of the present invention to substitute for time delay devices in the present invention an absolute position control feedback servomechanism for extension length control.

Controller 130 also provides control signals on lines 131 for actuating the workpiece-engaging assembly 30 and the slide box carriage assembly. In the preferred embodiment, the above driving means are controlled by solenoid valves which control the supply of pressurized air to pneumatic cylinders PN1 and PN2. A control signal drives coil C1 for a first solenoid valve V1, which connects air from air supply 132 to pneumatic cylinder PN1. Check valve CV1 dishcarges air from valve V1 and cylinder PN1 in the conventional manner.

Coil C2 of solenoid valve V2 controls the supply of air to pneumatic cylinder PN2, which moves the slide box forward and backward on the base plate. Check valve CV2 discharges air pressure from valve V2 and pneumatic cylinder PN2.

Coil C3 of solenoid valve V3 controls the provision of vacuum from a vacuum source 133 to suction cups 31, 32.

Controller 130 also provides a signal designated ARM RETRACTING on line 135 to the molding machine control device, which serves as a safety signal to insure that the mold does not close for a new molding cycle until the arm has cleared the molding machine.

OPERATION

Figure 9:
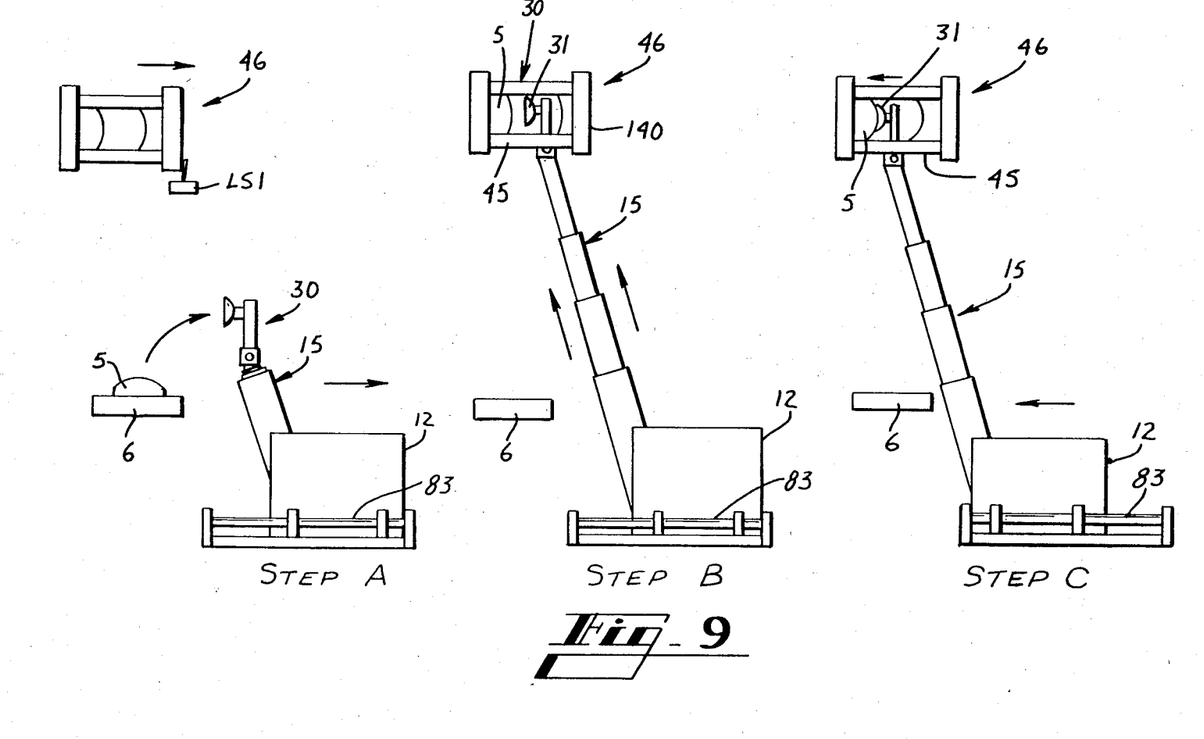

Turning to FIG. 9, there will now be discussed the method utilized in the preferred embodiment for accomplishing the objectives of the present invention. At step A, the opening of the molding machine 46 actuates limit switch LS1, providing an extraction signal to the controller 130 to initiate a removal operation. Step A incidentally shows the completion of the last step of the operation wherein the molded article 5 is deposited on a conveyor belt 6 as the workpiece-engaging assembly 30 returns to its first or substantially vertical position.

At step B, the arm 15 extends until the workpiece-engaging assembly 30 enters the space between the mold halves 140, 141 and the suction cup 31 is positioned in proximity to a molded article 5 contained in the mold.

At step C, pneumatic cylinder PN2 is actuated, driving the slide box 12 forward and causing the suction cup 31 to engage the molded article 5. In some applications, the forward movement of the slide box can accompany the extension of the arm, provided that obstacles are avoided and adequate contact is made with the molded article. When the suction cup has engaged the article, suction is provided so that the molded article will adhere to the suction cup.

At step D, prior to the closing of the mold, the arm 15 retracts, carrying the molded article 5 and clearing the tie bar 45 of the molding machine 46. As soon as the molded article 5 has cleared the tie bar 45, the molding mchine can begin a new molding cycle. The signal ARM RETRACTING can then be provided by the controller 130 so to signal the molding machine that a new molding cycle may be initiated. Also at step D, the slide box 12 is shown retracting from its second or forward position back towards the first or rearward position. It will be appreciated that in some applications, the retraction of arm 15 and the retreating movement of the slide box 12 can occur simultaneously, provided that the workpiece-engaging assembly 30 and any articles carried thereby clear the parts of the molding machine.

At step E, the molding machine has closed to begin another molding cycle. Arm 15 reaches its fully retracted position, and the pivoting movement of the workpiece-engaging assembly 30 may begin for release of the molded article 5 onto the conveyor belt 6.

At step F, the slide box 12 again moves forward from the rearward position to the forward position for release of the article 5 onto the conveyor belt 6. It should be understood that the pivoting of the workpiece-engaging assembly 30 and the movement of the slide box 12 towards the conveyor belt 6 may occur simultaneously, provided that the molded article is satisfactorily deposited upon the conveyor belt 6. After the workpiece-engaging assembly 30 has pivoted and placed the molded article on the conveyor belt 6, suction may be released and the workpiece-engaging assembly pivoted upright as shown in step A so that the manipulator is ready for the mold opening for a new cycle.

The alternative workpiece-engaging assembly 30b shown in FIG. 10 is particularly adapted for operation in connection with a double conveyor belt. To illustrate, FIG. 11 shows the final step of operation in a sequence similar to that illustrated in FIG. 9. Belts 6a, 6b are parallel and spaced apart, straddling the arm 15. When arm 15 retracts, workpieces 5 are simultaneously discharged onto both belts 6a and 6b.

The preferred embodiment of the present invention has been disclosed by way of example and it will be understood that other modifications may occur to those skilled in the art without departing from the scope and the spirit of the appended claims.

I claim:

1. A method for engaging and removing a molded article from a molding machine, comprising the steps of:
    detecting the opening of the molding machine and providing a mold opening signal in response to the opening of the mold;

extending a telescoping extensible and retractable arm into the space between the mold halves in response to the mold opening signal;

engaging the molded article in the molding machine with workpiece engaging means carried by the arm;

retracting the arm and the molded article carried by the workpiece engaging means out of the space between the mold halves; and releasing the molded article at a work station remote from the mold.

2. The method of claim 1, further comprising pivoting a wrist swivel joint carried by the arm from a first position to a second, lowered position to release the article at the work station.

3. The method of claim 1, wherein the telescoping extensible and retractable arm comprises a plurality of telescoping tubular members, and the step of extending the arm comprises unwinding a cable from a cable drum and pushing the innermost one of the telescoping tubular members with the end of the cable.

4. The method of claim 3, wherein the step of engaging the molded article in the molding machine comprises moving a suction cup into contact with a surface of the molded article, and further comprising the step of imparting suction to the suction cup from a source of vacuum through said cable to cause the suction cup to adhere to the molded article.

5. The method of claim 1, wherein the step of engaging the molded article in the molding machine comprises moving a base portion to which the arm is mounted forward to place the workpiece engaging means in contact with the molded article.

6. The method of claim 5, further comprising the step of moving the base portion backwards after the workpiece engaging means has engaged the molded article to remove the molded article from the mold.

7. The method of claim 5, further comprising the step of moving the base portion forward towards the work station after the arm has retracted carrying the molded article.

8. A workpiece engaging apparatus for engaging with molded articles in a molding machine and for depositing the articles at place removed from the molding machine, comprising:

a base portion positioned adjacent the molding machine, an extensible arm mounted at one end to said base portion and having an upper end extensible along a longitudinal axis into the space between the mold halves of the molding machine when the molding machine is opened, workpiece engaging means attached to said upper end of said arm for engaging with the molded article, sequencing means responsive to the cycles of the molding machine for providing an extraction signal at a predetermined time during a cycle, extending and retracting means responsive to said extraction signal for extending said arm and said workpiece engaging means into the space between the mold halves and for retracting said arm and said workpiece engaging means and the engaged article out of the mold prior to the closing of the mold for a new cycle.

9. The apparatus of claim 8, further comprising control means responsive to said extraction signal for providing an extend-arm signal at a first predetermined time during a molding machine cycle and a retract-arm signal at a second predetermined time during said molding machine cycle, and wherein said extending and retracting means is responsive to said extend-arm signal for extending said arm to engage the article, and is thereafter responsive to said retact-arm signal for retracting said arm and the article to remove the article from the molding machine.

10. The apparatus of claim 8, further comprising carriage means for supporting said base portion, said base portion being capable of assuming a first position adjacent the molding machine and a second position spaced apart from said first position, and second driving means for moving said base portion from said first position to said second position.

11. The apparatus of claim 10, wherein said carriage means comprises at least one track bar, wherein said base portion is mounted to said track bar with supporting sleeves, and wherein said second driving means comprises a pneumatic cylinder mounted for driving said base portion between said first position and said second position.

12. The apparatus of claim 8, wherein said arm comprises a pluralilty of telescoping tubular members, and further comprising cable means having a compressive strength sufficient to support said arm, said workpiece engaging means, and the article when said arm is fully extended, said cable means being housed within said tubular members and having one end attached to the innermost one of said tubular members, and wherein said extending and retracting means comprises:

cable drum means for spooling the other end of said cable means, and cable drum driving means for rotating said drum means in one direction for winding said cable means to retract said arm and for rotating said drum means in the other direction for unwinding said cable means to extend said arm.

13. The apparatus of claim 12, wherein said workpiece engaging means comprises at least one suction cup for engaging with a surface of the workpiece, and wherein said cable means comprises a hollow elongate semirigid tube and further comprising a source of vacuum selectively operable to impart suction to said suction cup for engaging and removing the workpiece and for releasing suction for discharging the workpiece, and wherein said source of vacuum is in fluid communication with said suction cup through said tube.

14. The apparatus of claim 8, further comprising a wrist swivel joint attached to the upper end of said arm and pivotable about a wrist bend axis perpendicular to said longitudinal axis of said arm, and wherein said workpiece engaging means is mounted to said wrist swivel joint and movable therewith for engaging the article in a first plane and for discharging the article in a second plane.

15. The apparatus of claim 14, further comprising first driving means for pivoting said workpiece engaging means and said wrist swivel joint between said first plane and said second plane.

16. The apparatus of claim 15, wherein said sequencing means is further responsive to provide a release signal at a second predetermined time during a molding machine cycle, and wherein said first driving means is responsive to said release signal to pivot said wrist swivel joint, said workpiece engaging means, and the article engaged thereby to said second position to deposit the article.

17. A workpiece manipultor, comprising:
a base portion,
an extensible arm mounted at one end to said base portion and comprising a plurality of tubular telescoping members extensible and retractable along a longitudinal axis,
cable means housed within said telescoping members having one end attached to the innermost one of said tubular members,
cable drum means for spooling the other end of said cable means,
drum driving means for rotating said drum means in one direction for winding said cable means and in the other direction for unwinding said cable means, said arm extending as said cable means unwinds and retracting as said cable means winds, and
workpiece engaging means mounted to the upper end of said arm for engaging with a workpiece,
wherein said cable means pushes said innermost one of said tubular members to extend said arm and pulls said innermost one of said tubular members to retract said arm.

18. The manipulator of claim 17, further comprising sequencing means responsive to the cycles of a molding machine for providing an extraction signal at a predetermined time during a molding machine cycle, and control means responsive to said extraction signal for providing an extend-arm signal at a first predetermined time during a molding machine cycle and a retract-arm signal at a second predetermined time during said molding machine cycle, and wherein said drum driving means is responsive to said extend-arm signal for extending said arm to engage the workpiece, and is thereafter responsive to said retract-arm signal for retracting said arm and the workpiece to remove the workpiece from the molding machine.

19. The manipulator of claim 17, wherein said workpiece engaging means comprises a plurality of workpiece grasping members mounted to the arms of a cross-shaped mounting member, and further comprising scissoring means for pivoting the arms of said cross-shaped mounting member with respect to each other, whereby the workpieces engaged by the workpiece grasping members can avoid obstacles in the path of movement of the workpiece engaging means.

20. The manipulator of claim 17, further comprising a wrist swivel joint attached to the upper end of said arm and pivotable about a wrist bend axis perpendicular to said longitudinal axis of said arm, and first driving means for pivoting said workpiece engaging means and said wrist swivel joint, and wherein said workpiece engaging means is mounted to said wrist swivel joint and movable therewith for engaging the workpiece in a first plane and for discharging the workpiece in a second plane.

21. The manipulator of claim 20, wherein said first driving means comprises a pneumatic cylinder, and rack and pinion means operatively connected to said pneumatic cylinder for pivoting said wrist swivel joint and said workpiece engaging means.

22. The manipulator of claim 17, further comprising carriage means for supporting said base portion, said base portion being capable of assuming a first position and a second position spaced apart from said first position, and second driving means for moving said base portion from said first position to said second position.

23. The manipulator of claim 22, wherein said carriage means comprises at least one track bar, wherein said base portion is mounted to said track bar with supporting sleeves, and wherein said second driving means comprises a pneumatic cylinder mounted for driving said base portion between said first position and said second position.

24. The manipulator of claim 17, wherein said cable means comprises a hollow elongate semirigid tube having sufficient compressive strength to support said arm, said workpiece engaging means, and the workpiece engaged thereby, when said arm is fully extended.

25. The manipulator of claim 24, further comprising first fluid connector means attached to said workpiece engaging means and in fluid communication with said one end of said tube, second fluid connector means attached to said cable drum means and in fluid communication with said other end of said tube, and fluid driving means operatively connected to said cable drum means for providing a fluid flow through said second connector means, said tube, and said first connector means to said workpiece engaging means.

26. The manipulator of claim 25, wherein said fluid driving means comprises a source of vacuum, wherein said workpiece engaging means comprises at least one suction cup for engaging with a surface of the workpiece, and wherein said vacuum source is selectively operable to impart suction to said suction cup for engaging and removing the workpiece and for releasing suction for discharging the workpiece.

* * * * *